United States Patent
Kallio et al.

(10) Patent No.: US 7,050,789 B2
(45) Date of Patent: May 23, 2006

(54) SYSTEM AND METHOD FOR SERVICES ACCESS

(75) Inventors: Janne Kallio, Ylöjärvi (FI); Hasse Sinivaara, Espoo (FI)

(73) Assignee: Nokia Corporation, Espoo (FI)

( * ) Notice: Subject to any disclaimer, the term of this patent is extended or adjusted under 35 U.S.C. 154(b) by 444 days.

(21) Appl. No.: 10/160,387

(22) Filed: May 30, 2002

(65) Prior Publication Data

US 2003/0224756 A1 Dec. 4, 2003

(51) Int. Cl.
*H04M 1/66* (2006.01)

(52) U.S. Cl. .............. 455/411; 455/41.2; 380/270; 713/150

(58) Field of Classification Search .............. 455/426.1, 455/410, 411, 41.2, 41.3; 380/270; 713/150, 713/168

See application file for complete search history.

(56) References Cited

U.S. PATENT DOCUMENTS

| 6,453,159 | B1 * | 9/2002 | Lewis ............. 455/411 |
| 2002/0069278 | A1 * | 6/2002 | Forslow ............ 709/225 |
| 2002/0132605 | A1 * | 9/2002 | Smeets et al. ....... 455/411 |

* cited by examiner

*Primary Examiner*—Lee Nguyen
(74) *Attorney, Agent, or Firm*—Morgan & Finnegan L.L.P.

(57) ABSTRACT

Systems and methods for facilitating access to services, including systems and methods providing for the use and/or distribution of keys employable in accessing services.

51 Claims, 4 Drawing Sheets

SYSTEM AND METHOD FOR SERVICES ACCESS

FIELD OF INVENTION

This invention relates to systems and methods for services access

BACKGROUND INFORMATION

In recent years, there has been an increase in the use of various terminals to access services such as local area network access, internet access, WAP (Wireless Application Protocol) landing page access, and media access. Such terminals include, for example, wireless terminals, personal computers, and PDAs.

Accordingly, there may be increased interest in technologies that may facilitate access to such services.

SUMMARY OF THE INVENTION

According to embodiments of the present invention, there are provided systems and methods for facilitating access to services.

Certain of these embodiments provide for the use and/or distribution of keys employable in accessing services.

DETAILED DESCRIPTION OF THE INVENTION

General Operation

According to embodiments of the present invention there are provided systems and methods for providing access to services. More specifically, certain embodiments provide for the use and/or distribution of keys employable in accessing services. Such services may include, for example, local area network access, internet access, WAP (Wireless Application Protocol) landing page access, and media access. A key might be implemented, for example, as an n-bit number, where "n" is a predetermined number. Thus a key might be, for instance, a 128-bit or 256-bit number.

It certain embodiments, keys may function such that an entity wishing to gain access to a service must possess one or more particular keys also possessed by an entity offering the service. Keys of this sort may be referred to herein as "symmetrical keys". As a specific example, a symmetrical key may be, and/or be able to function as, a Bluetooth link key. Key distribution, in such embodiments of the invention, may be implemented such that a symmetrical key is distributed to both a device desiring services access, and to one or more entities offering services. The device desiring services access could then employ its received symmetrical key in accessing services provided by entities that also received the key.

A device that accesses services may be, for example, a wireless terminal, while an entity offering one or more services may be an access point. More specifically, an access point might be a Bluetooth base station, with Bluetooth being employed for communications between the access point and any particular terminal or the like. As another specific example, an access point might be an 802.11b base stations, with 802.11b being employed for communications between the access point and any particular terminal or the like. In the case where Bluetooth is employed for communications, distributed symmetrical keys may be capable of functioning as Bluetooth link keys.

Figure 1:
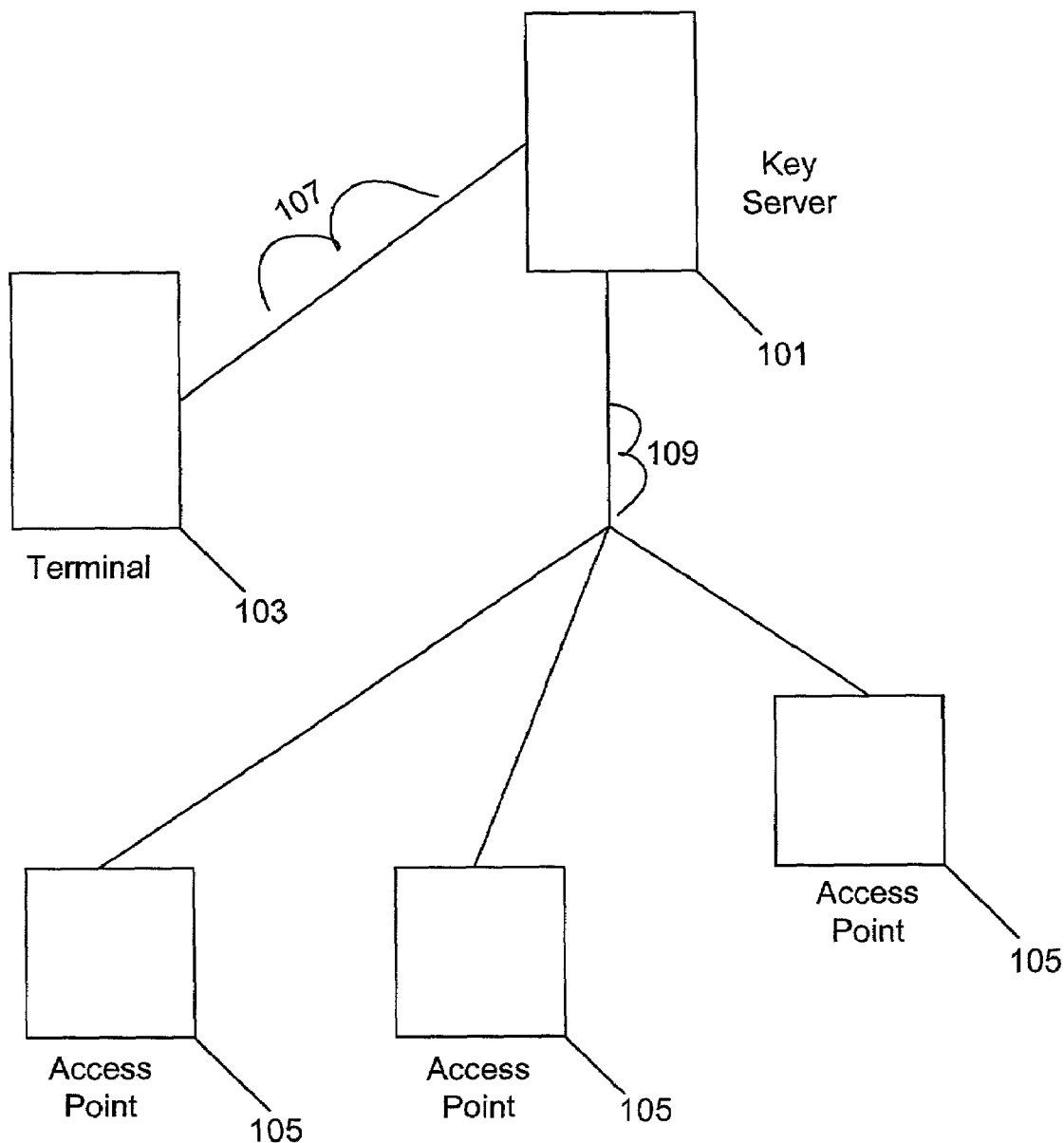
FIG. 1 shows an exemplary network topology corresponding to certain embodiments of the present invention.

Shown in FIG. 1 is an exemplary network topology corresponding to certain embodiments of the present invention. Shown in FIG. 1 is key server 101. Key server 101 may act to distribute a key, such as a symmetrical key, to terminal 103 and to one or more access points 105. As a specific example, key server 101 might distribute a key to terminal 103 and each access point 105. As another specific example, key server 101 might distribute a key to terminal 103 and two access points 105. Terminal 103 could be a wireless terminal, while the access points 105 could be wireless base stations.

It is noted that the access points shown could correspond to more than one zone and/or service provider. For instance, two of the access points shown could correspond to a first Bluetooth zone, while the third access point shown could correspond to a second Bluetooth zone. Although only one key sever is shown here, it is noted that there could be a plurality of key servers, each perhaps corresponding to a different zone. It is further noted that there could be more terminals than illustrated in FIG. 1, and more or less access points than illustrated in FIG. 1.

Distribution to terminal 103 could occur via link 107, while distribution to an access point 105 could occur via link 109. Link 107 might be additionally employed, for instance, to receive a key request from terminal 103. Link 107 could be implemented, for example, via SMS (short message service) communications. Link 109 could be implemented, for example, via a LAN (local area network), a WAN (wide area network), or the Internet, perhaps employing IPsec (Internet Protocol security).

As alluded to above, terminal 103 might employ a key received from server 101 in accessing services provided by access points 105 that also received the key. In accessing the service or services provided by an access point 105, terminal 103 and the access point might communicate, for example, via Bluetooth or 802.11b.

Various aspects of the present invention will now be described in greater detail.

Key Request and Key Distribution

Figure 2:
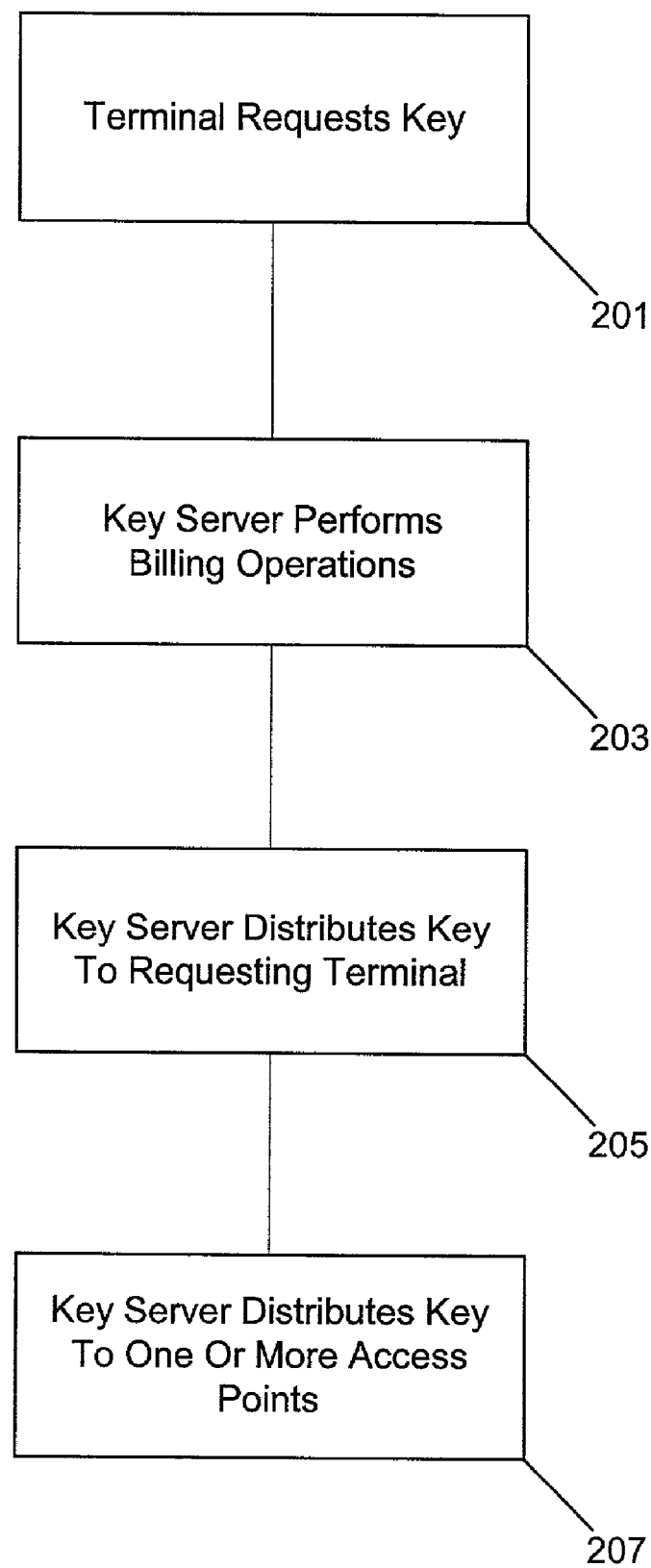
FIG. 2 is a flow chart showing steps involved in key request and key distribution in accordance with embodiments of the present invention.

Shown in FIG. 2 are steps involved in key request and key distribution in accordance with embodiments of the present invention. As a first step, a terminal or the like may request a key from a key server (step 201). The request may specify an identifier corresponding to the terminal, it's user, and/or the like. The identifier could be, for example, a MAC (media access control) address, a MIN (mobile identification number), a MDN (mobile directory number), or a Bluetooth device address. As will be discussed in greater detail below, a key server may take steps to ensure the anonymity of a requesting terminal and/or its user in the case where the terminal's request does not include such an identifier.

Accordingly, a terminal's user might choose to specify and/or perform actions so that a request not include an identifier. A user might do so, for example, if she wished to enjoy such anonymity. The request may additionally specify an indication of service provider and/or zone. The zone could be, for example, a Bluetooth zone.

The request may be dispatched in a number of ways. For example, the request could be dispatched as an SMS message directed from the terminal to the key sever. As another example, the terminal could access a web page, WAP landing page, or the like that solicits all or some of the above-noted request information. The page's solicitation might be implemented, for example, via forms, JavaScript, Java, and/or the like. Thus the page could provide a form having fields for items such as identifier, service provider, and/or zone. The information solicited by the page could be provided, for instance, automatically by the terminal or manually by the terminal's user.

In certain embodiments, upon receipt of the request, a key server might perform operations to charge for the key that will be distributed (step 203). Accordingly, the server might take note of any terminal identifier included in the request and take steps to charge the user, account, or the like corresponding to that identifier. In some embodiments, the server might first seek the permission of the terminal and/or its user before making any monetary charges. Accordingly, the key server might send a message to the terminal, explaining that a certain fee would need to be charged in order to fulfill the request, and asking if this was acceptable. The message could, for example, be presented to the terminal's user, perhaps as a GUI (graphical user interface) dialog box with buttons for "yes" and "no".

Upon receiving the user's answer, the terminal could pass this information to the key server. The key server could act to abort processing of the request unless an answer of "yes" was received. The server's message regarding fees, and the response thereto dispatched by the terminal, could be transmitted via SMS. It is specifically noted that in certain embodiments no such billing operations would be performed.

In the case where the request did not include an identifier, the server might next act to create an "anonymity address" for the terminal. Such an anonymity address could be, for example, a 48-bit address similar in form to a Bluetooth hardware address, but whose composition bore no relation to any identifier corresponding to the terminal, its user, or the like. Such an address could be randomly generated by the key server, perhaps with subject to certain constraints. For example, random selection of an anonymity address could be subject to the constraint that no other terminal be currently assigned the particular address. Such could be implemented, for example, by having the server maintain a listing of all currently-assigned anonymity addresses.

Upon randomly creating an anonymity address, the server could check the newly-created address against the list. In the case where the address was found to be on the list, the server could generate a new anonymity address and repeat the checking process. In the case where the created address was not found to be on the list, the anonymity address could be recorded in the list and reserved for the use of the requesting terminal. In certain embodiments, the list could be shared by several key servers to ensure that anonymity address currently assigned to a terminal by one server would not be assigned to another terminal by another server.

Random selection could be further subject to the constraint that a created address not be identical to an actual and/or existing Bluetooth hardware address, MAC address or other identifier. This could be achieved, for example, by presenting a key server with a bank of acceptable anonymity addresses such that the server could generate an anonymity address by randomly selecting one from the bank. This could also be achieved, for example, by subjecting randomization to certain constraints, for example the constraint that a randomly-created anonymity address fall within a predetermined numerical range.

Having received a terminal's request and performed any necessary billing operations, a key server could act to distribute a particular key to the requesting terminal (step 205). Along with the key could be dispatched an indication of the zones, service providers, access points, and/or the like with which the key may be used. As alluded to above, a key server may deliver a key to one or more access points or the like. Accordingly, the indication of the zones and/or the like where a key could be used might correspond to the access points or the like to which the key server intended to deliver the key. In embodiments where a key server generated an anonymity address, distributed to the requesting terminal along with a key could be the determined anonymity address. The key may be, for example, a symmetrical key, and might be capable of acting in the capacity of a Bluetooth link key.

As noted above, a key distributed by a key server to a terminal or the like may be additionally distributed by the server to one or more access points, perhaps over the Internet (step 207). Distribution to access points might occur in a secure manner, perhaps employing IPsec. Along with the key may be sent an identifier associatable with, for instance, the terminal, the terminals'user, and/or the individual or entity responsible for any billing associate with the terminal. The associatable identifier could be, for instance, the MAC address or Bluetooth device address specified in the terminal's request. In the case where an anonymity address had been generated for the terminal, the anonymity address could be sent along with the key in place of an associatable identifier. In certain embodiments, it may be desired that a key expire after a certain date. Accordingly, the server could distribute to the access points, along with a key, an indication of a date after which the key should be considered invalid.

In certain embodiments, a key might be distributed only to access points associated with a particular service provider and/or zone. The service provider and/or zone could be, for instance, a service provider and/or zone specified in the terminal's request. As an alternate example, a key server might determine a service provider and/or zone based on an identifier specified in the terminal's request.

Key Employment

Figure 3:
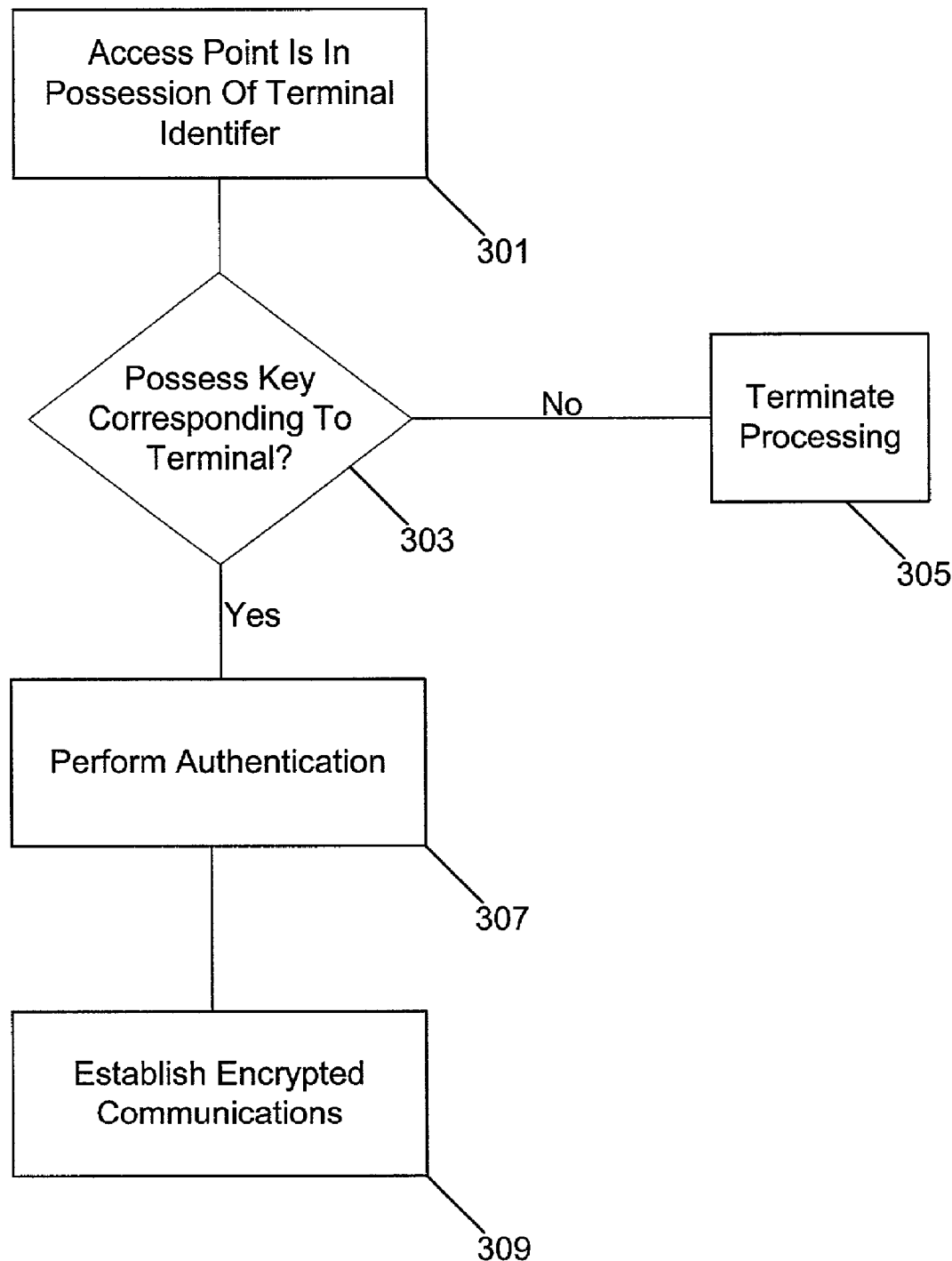
FIG. 3 is a flow chart showing steps involved in key employment according to embodiments of the present invention.

As noted above, one or more keys may be employed in allowing a terminal or the like access to services provided by an access point or the like. Shown in FIG. 3 are steps involved in key employment according to embodiments of the present invention. In some embodiments, a terminal wishing to access one or more services via an access point may initiate communications with that access point. In such embodiments the terminal may, as a first step, send to the access point an identifier. It is further noted that, in certain embodiments, an access point may act to offer its service or services to terminals it is capable of connecting to (e.g., terminals in its wireless transmission and/or reception range).

For example, an access point may broadcast a message, offering one or more services, to all terminals in its range. The message might indicate that an interested terminal respond with an identifier. Thus an interested terminal might transmit to the access point an identifier such as the Bluetooth hardware address of the terminal, the MAC address of the terminal, the terminal's MIN, the terminal's MDN, or an anonymity address given to the terminal. It is noted that, in certain embodiments, a base station's message offering one or more services might indicate an identifier corresponding to the access point, the zone with which the access point is associated, and/or the service provider with which the access point is associated.

Accordingly, in both the case where a terminal responds affirmatively to an access point's offer of services, and the case where the terminal requests service from the access point in absence of such an offer, the access point may find itself in possession of an identifier corresponding to a terminal that desired access to one or more services (step 301). In certain embodiments, the access point might next consult an associated store to learn if it possessed a key corresponding to the terminal (step 303).

Such a store could be populated, for example, via previously-noted key server transmissions including terminal identifiers and access keys. In the case where the consultation of the store failed to yield a key corresponding to the terminal, the access point might terminate processing of the terminal's request (step 305). In certain embodiments, the access point might additionally inform the terminal of the termination. It is noted that an access point could, in certain embodiments, terminate processing in the case where the consultation yielded a key corresponding to the terminal, but the key was found to be expired. As noted above, information concerning key expiration could be included in a key server's transmissions to access points.

According to various embodiments, an authentication procedure may be performed in the case where an access point's query finds itself in possession of a key corresponding to a terminal desiring services access (step 307). In some embodiments, the key distributed by a key server for use in communications between the terminal and the access point could be employed in authentication as an initialization key. Alternately, an initialization key for authentication might be derived from values such a terminal and/or access point device address, a random number, and/or a PIN (personal identification number) could be employed.

More generally, authentication could involve, for instance, a challenge-response scheme whereby it could be determined, without having a terminal or an access point reveal keys, if both entities possessed a key distributed by a key server for use in communications between the terminal and the access point. In certain embodiments, authentication could be performed in a manner compatible with, in accordance with, analogous to, and/or similar to Bluetooth authentication as is known in the art. It is specifically noted that in some embodiments no authentication would be performed.

Upon the successful completion of any performed authentication, encrypted communications for service provision could be established between a terminal and a base station (step 309). In certain embodiments, keys distributed by a key server could be directly employable as encryption keys. In other embodiments, encryption keys might be derived from distributed keys. In, for example, embodiments where communications between a terminal and a base station are via Bluetooth, the key distributed by a key server for use in communications between the terminal and the access point could be employed as a link key, and one or more encryption keys based on the link key could be established and employed for encrypted communications between the terminal and the access point.

It is specifically noted that the just-described process for employing a key may be repeated, for example, in the case where a terminal or the like moves to a different zone, an area served by a different service provider, and/or moves in or out of transmission range of one or more access points.

Hardware and Software

Certain devices employed in accordance with the present invention may be implemented using computers. For example, the above-noted key servers, terminals, and access points may be implemented using network-capable computers. Furthermore, certain procedures and the like described herein may be executed by or with the help of computers. The phrases "computer", "general purpose computer", and the like, as used herein, refer but are not limited to a processor card smart card, a media device, a personal computer, an engineering workstation, a PC, a Macintosh, a PDA, a wired or wireless terminal, a server, an access point, or the like, perhaps running an operating system such as OS X, Linux, Darwin, Windows CE, Windows XP, Palm OS, Symbian OS, or the like, perhaps with support for Java or Net.

Figure 4:
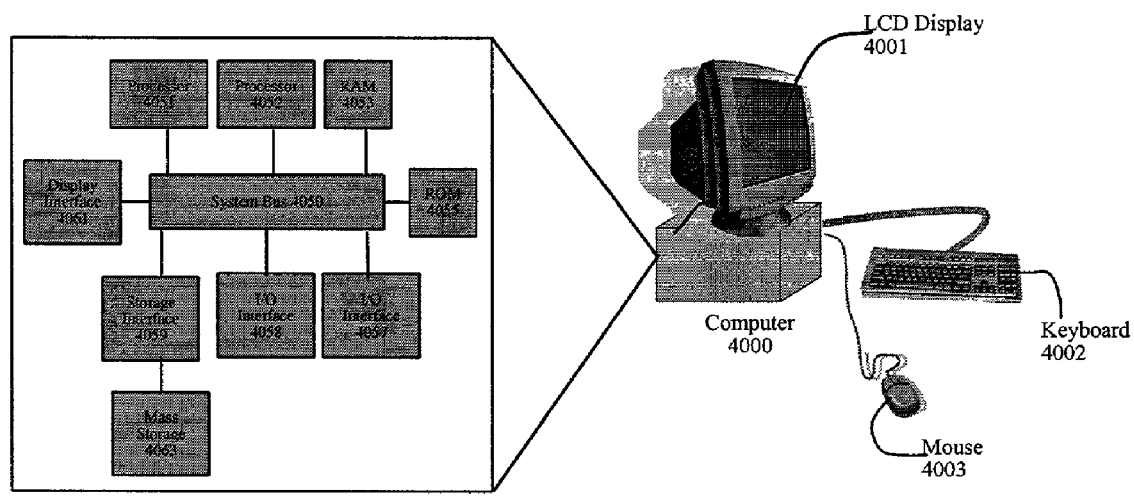
FIG. 4 shows an exemplary general purpose computer employable in various embodiments of the present invention.

The phrases "general purpose computer", "computer", and the like also refer, but are not limited to, one or more processors operatively connected to one or more memory or storage units, wherein the memory or storage may contain data, algorithms, and/or program code, and the processor or processors may execute the program code and/or manipulate the program code, data, and/or algorithms. Accordingly, exemplary computer 4000 as shown in FIG. 4 includes system bus 4050 which operatively connects two processors 4051 and 4052, random access memory (RAM) 4053, read-only memory (ROM) 4055, input output (I/O) interfaces 4057 and 4058, storage interface 4059, and display interface 4061. Storage interface 4059 in turn connects to mass storage 4063.

Each of I/O interfaces 4057 and 4058 may be an Ethernet, IEEE 1394, IEEE 802.11b, Bluetooth, DVB-T (Terrestrial Digital Video Broadcast), DVB-S (Satellite Digital Video Broadcast), DAB (Digital Audio Broadcast), GPRS (General Packet Radio Service), UMTS (Universal Mobile Telecommunications System), or other interface known in the art. Mass storage 4063 may be a hard drive, optical drive, or the like. Processors 4057 and 4058 may each be a commonly known processor such as an IBM or Motorola PowerPC, an AMD Athlon, an AMD Hammer, an Intel StrongARM, an Intel Itanium, or an Intel Pentium. Computer 4000 as shown in this example also includes an LCD display unit 4001, a keyboard 4002 and a mouse 4003. In alternate embodiments, keyboard 4002 and/or mouse 4003 might be replaced with a touch screen, pen, or keypad interface. Computer 4000 may additionally include or be attached to card readers, DVD drives, or floppy disk drives whereby media containing program code may be inserted for the purpose of loading the code onto the computer.

In accordance with the present invention, a computer may run one or more software modules designed to perform one or more of the above-described operations, the modules being programmed using a language such as Java, Objective C, C, C#, or C++ according to methods known in the art.

Ramifications and Scope

Although the description above contains many specifics, these are merely provided to illustrate the invention and should not be construed as limitations of the invention's scope. Thus it will be apparent to those skilled in the art that various modifications and variations can be made in the system and processes of the present invention without departing from the spirit or scope of the invention.

What is claimed is:

1. A method for providing access, comprising:
   receiving, from a terminal via cellular network messaging, a request for a key to access short-range communications services;
   distributing, to the terminal via cellular network messaging, a symmetrical key; and
   distributing a key to a plurality of short-range communications access points,
   wherein the symmetrical key is employable by the terminal in accessing short-range communications services provided by one or more of the access points.

2. The method of claim 1, wherein said symmetrical key can function as a bluetooth link key.

3. The method of claim 1, wherein said symmetrical key is a bluetooth link key.

4. The method of claim 1, further comprising:
   creating an anonymity address for said terminal.

5. The method of claim 1, wherein said request is received via short message service.

6. The method of claim 1, wherein said request is received using a landing page.

7. The method of claim 1, further comprising:
   billing a party for key distribution to said terminal.

8. The method of claim 1, further comprising:
   billing a party for key distribution to said access points.

9. The method of claim 1, wherein there is an expiration date associated with said symmetrical key.

10. The method of claim 1, further comprising:
    receiving from said terminal an identifier corresponding to the terminal.

11. The method of claim 10, wherein said identifier is the terminal's bluetooth hardware address.

12. The method of claim 10, wherein said identifier is the terminal's media access control address.

13. The method of claim 10, wherein said identifier is the terminal's mobile directory number.

14. The method of claim 10, wherein said identifier is the terminal's mobile identification number.

15. The method of claim 1, wherein key distribution to said terminal is via short messaging service.

16. The method of claim 1, wherein key distribution to said access points employs internet protocol security.

17. The method of claim 1, wherein short-range communications are via bluetooth.

18. The method of claim 1, wherein short-range communications are via 802.11b.

19. The method of claim 1, wherein said access points relate to a single zone.

20. The method of claim 1, wherein said access points relate to multiple zones.

21. The method of claim 20, wherein said zones are bluetooth zones.

22. The method of claim 1, wherein said access points relate to a single service provider.

23. The method of claim 1, wherein said access points relate to multiple service providers.

24. The method of claim 1, further comprising determining that one or more criteria are satisfied.

25. The method of claim 1, wherein a fee is charged for services access.

26. A system for providing access, comprising:
    a memory having program code stored therein; and
    a processor operatively connected to said memory for carrying out instructions in accordance with said stored program code;
    wherein said program code, when executed by said processor, causes said processor to perform the steps of:
    receiving, from a terminal via cellular network messaging, a request for a key to access short-range communications services;
    distributing, to the terminal via cellular network messaging, a symmetrical key; and
    distributing a key to a plurality of short-range communications access points,
    wherein the symmetrical key is employable by the terminal in accessing short-range communications services provided by one or more of the access points.

27. The system of claim 26, wherein said symmetrical key can function as a bluetooth link key.

28. The system of claim 26, wherein said symmetrical key is a bluetooth link key.

29. The system of claim 26, wherein said processor further performs the step of:
    creating an anonymity address for said terminal.

30. The system of claim 26, wherein said request is received via short message service.

31. The system of claim 26, wherein said request is received using a landing page.

32. The system of claim 26, wherein said processor further performs the step of:
    billing a party for key distribution to said terminal.

33. The system of claim 26, wherein said processor further performs the step of:
    billing a party for key distribution to said access points.

34. The system of claim 26, wherein there is an expiration date associated with said symmetrical key.

35. The system of claim 26, wherein said processor further performs the step of:
    receiving from said terminal an identifier corresponding to the terminal.

36. The system of claim 35, wherein said identifier is the terminal's bluetooth hardware address.

37. The system of claim 35, wherein said identifier is the terminal's media access control address.

38. The system of claim 35, wherein said identifier is the terminal's mobile directory number.

39. The system of claim 35, wherein said identifier is the terminal's mobile identification number.

40. The system of claim 26, wherein key distribution to said terminal via short messaging service.

41. The system of claim 26, wherein key distribution to said access points employs internet protocol security.

42. The system of claim 26, wherein short-range communications are via bluetooth.

43. The system of claim 26, wherein short range communications are via 802.11b.

44. The system of claim 26, wherein said access points relate to a single zone.

45. The system of claim 26, wherein said access points relate to multiple zones.

46. The system of claim 45, wherein said zones are bluetooth zones.

47. The system of claim 26, wherein said access points relate to a single service provider.

48. The system of claim 26, wherein said access points relate to multiple service providers.

49. The system of claim 26, wherein said processor further performs the step of:
    determining that one or more criteria are satisfied.

50. The system of claim 26, wherein a fee is charged for services access.

51. A terminal, comprising:
- a memory having program code stored therein;
- a processor operatively connected to said memory for carrying out instructions in accordance with said stored program code;
- a cellular network interface operatively connected to the processor; and
- a short-range communications network interface operatively connected to the processor;
- wherein said program code, when executed by said processor, causes said processor to perform the steps of:
    - dispatching, to a server via cellular network messaging, a request for a key to access short-range communications services; and
    - receiving, from the server via cellular network messaging, a symmetrical key,
    - wherein the server distributes a key to a plurality of short-range communications access points, and
    - wherein the symmetrical key is employable by the terminal in accessing short-range communications services provided by one or more of the access points.

* * * * *